United States Patent [19]
Sarraf et al.

[11] Patent Number: 5,105,206
[45] Date of Patent: Apr. 14, 1992

[54] THERMAL PRINTER FOR PRODUCING TRANSPARENCIES

[75] Inventors: Sanwal P. Sarraf, Webster; Scott A. Brownstein; Michael J. Barry, both of Rochester, all of N.Y.

[73] Assignee: Eastman Kodak Company, Rochester, N.Y.

[21] Appl. No.: 457,595

[22] Filed: Dec. 27, 1989

[51] Int. Cl.⁵ .............................................. G01D 15/10
[52] U.S. Cl. .............................. 346/76 L; 346/76 PH
[58] Field of Search ............... 346/76 L, 76 PH, 108

[56] References Cited

U.S. PATENT DOCUMENTS

| | | | |
|---|---|---|---|
| 3,750,189 | 7/1973 | Fleischer | 346/74 ES |
| 3,836,754 | 9/1974 | Toye et al. | 235/61.12 N |
| 4,099,208 | 7/1978 | Tasaku et al. | 358/296 |
| 4,245,228 | 1/1981 | Cook | 346/108 |
| 4,520,370 | 5/1985 | Fujii et al. | 346/76 L |
| 4,547,784 | 10/1985 | Erlichman et al. | 346/76 PH |
| 4,631,551 | 12/1986 | Vergona | 346/108 |
| 4,728,965 | 3/1988 | Kessler et al. | 346/108 |
| 4,744,073 | 5/1988 | Sugiki | 369/112 |
| 4,760,407 | 7/1988 | Arimoto et al. | 346/108 |
| 4,791,591 | 12/1988 | Asanuma et al. | 364/571.04 |
| 4,804,975 | 2/1989 | Yip | 346/76 L |
| 4,804,977 | 2/1989 | Long | 346/76 L |
| 4,833,124 | 5/1989 | Lum | 503/227 |
| 4,853,709 | 8/1989 | Stein et al. | 346/108 |

*Primary Examiner*—Benjamin R. Fuller
*Assistant Examiner*—Victor DeVito
*Attorney, Agent, or Firm*—Donald D. Schaper

[57] ABSTRACT

A thermal printer is disclosed which is particularly suitable for making slide transparencies. The printer includes a laser which provides the necessary thermal energy to effect a transfer of dye from a donor element to a receiver element. A beam from the laser passes through suitable optics and is scanned onto the receiver element by a galvonometer. In order to insure the transfer of dye from the donor at a suitable resolution and with sufficient speed, a relatively high-powered single transverse mode coherent laser is used.

3 Claims, 3 Drawing Sheets

THERMAL PRINTER FOR PRODUCING TRANSPARENCIES

CROSS REFERENCE TO RELATED APPLICATION

Reference is made to U.S. patent application Ser. No. 457,593, entitled "Thermal Printer", filed in the name of S. Sarraf on even date herewith; this application is assigned to the assignee of the present invention.

BACKGROUND OF THE INVENTION

1. Field of the Invention

This invention relates to a thermal printer, and more particularly, to such a printer which is particularly suitable for producing transparencies or slides.

2. Description of the Prior Art

In one type of thermal printer, a dye-donor element is placed over a dye-receiving element, and the superposed elements are supported for cooperation with a print head having a plurality of individual heating resistors. When a particular heating resistor is energized, it causes dye from the donor to transfer to the receiver. The density or darkness of the printed color dye is a function of the energy delivered from the heating element to the donor. One of the problems in printers of this type is that the thermal time constant of the resistors is quite long. As a result, the printing speed is relatively slow, and the image contrast is limited.

It is known in thermal printing to use lasers instead of resistors to effect the transfer of dye from a donor element to a receiver element. In U.S. Pat. No. 4,804,975, for example, there is shown thermal dye transfer apparatus which comprises an array of diode lasers which can be selectively actuated to direct radiation onto a dye-carrying donor. Radiation from the diode lasers is modulated in accordance with an information signal to form an image on a thermal print median. The diode laser array extends the full width of the print medium. One problem with this apparatus is that it is too expensive for many applications. The initial cost of such a large array in relatively high, and failure of only one diode laser in the arry will result in discarding the entire array. A further problem with the patented apparatus is that it is difficult to obtain the density and resolution needed for a high-quality transparency.

SUMMARY OF THE INVENTION

It is an object of the present invention to overcome the problems discussed above in the preior art and to provice an improved thermal printer for use in producing transparencies.

In accordance with one aspect of the invention, there is provided a thermal printer for forming an image on a thermal medium for producing transparencies, the printer comprising: means for supporting a thermal medium; a light source which includes a diode laser; means for modulating the diode laser in accordance with an information signal; optical means for shaping the modulated beam; means for receiving the beam from the optical means and for scanning the beam across the medium; means for effecting relative movement between the supporting means and the receiving and scanning means, the modulating means, and the means for effecting relative movement in timed relation to each other.

In one embodiment of the present invention a donor element in the form of a web is supported in contact with a receiver element which is mounted on a rotatable drum for movement with the web. The donor and receiving elements are moved in the page scan direction, and a galvanometer scans a laser beam across the donor element in the scan direction. A diode laser, which is driven in accordance with an information signal, supplies the laser beam to the galvanometer through a collimator lens and beam shaping optics. The beam from the galvonometer passes through an f$\theta$ lens.

The thermal printer of the present invention produces a very high resolution, and thus, it is particularly suitable for producing slides in a standard slide format. Both transferred and retained images can be written in the printer. Bimodal as well as continuous tone images can be produced, and the printer can be used to make both reflection images and transparencies.

Other features and advantages will become apparent upon reference to the following description of the preferred embodiment when read in light of the attached drawings.

DESCRIPTION OF THE PREFERRED EMBODIMENT

Figure 1:
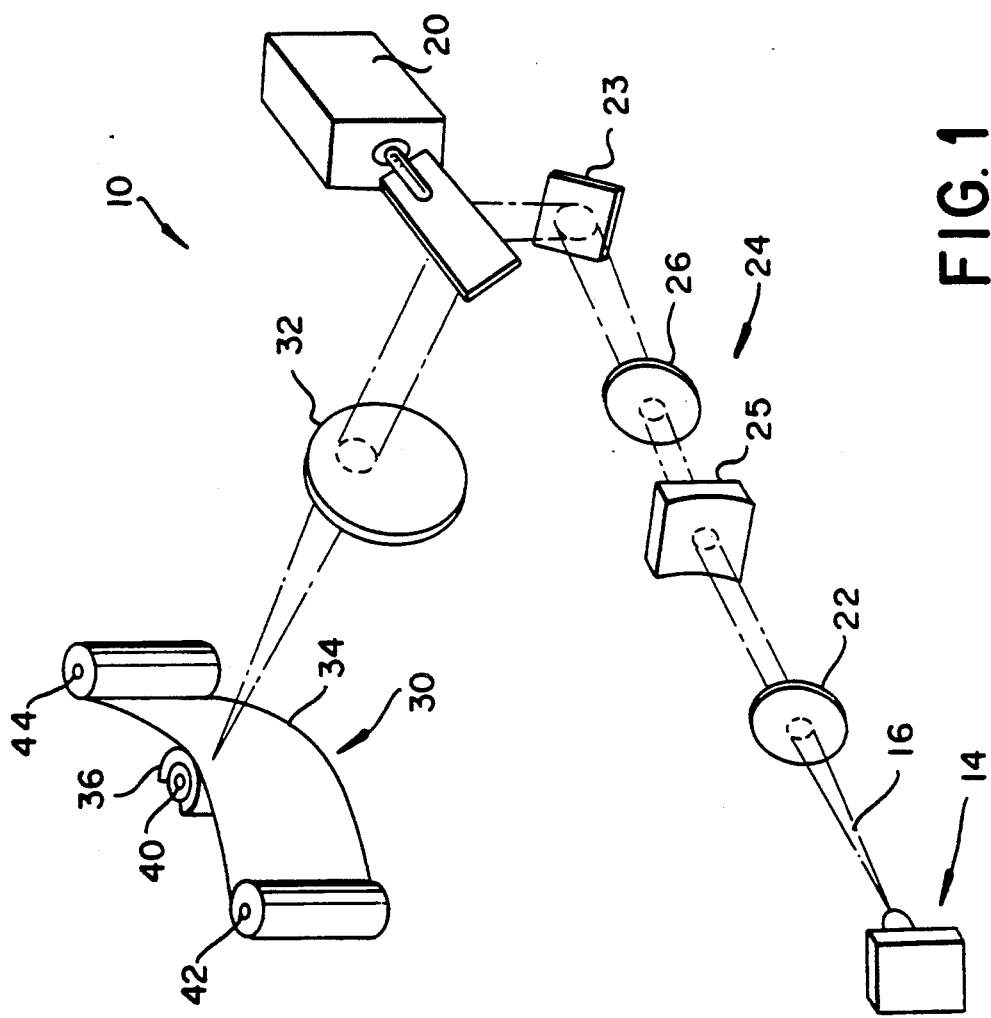
FIG. 1 is a schematic perspective view of the thermal printer of the present invention.

With reference to FIG. 1, there is shown a thermal printer 10 constructed in accordance with the present invention. Printer 10 comprises an optical head 14 which produces a laser beam 16 that is modulated in accordance with an information signal. Beam 16 is directed to a galvanometer 20 through a collimating lens 22, beam shaping optics 24, and a turning mirror 23. Beam shaping optics 24 includes a pair of cylindrical lenses 25 and 26. Galvanometer 20 is adapted to scan the beam onto a thermal print medium 30. The beam 16 from galvanometer 20 passes through an f$\theta$ lens 32 which functions in a well-known manner to maintain a flat field and a constant velocity of the scanned spot on the thermal print medium.

The thermal print medium 30 is of a type in which a dye is transferred by sublimation from a donor element 34 to a receiver element 36 as a result of heating the dye in the donor. As shown in FIG. 1, receiver element 36 is attached to a rotatable drum 40 for movement therewith, and donor element 34 is in the form of a web which extends between a supply roll 42 and a take-up roll 44. Receiver element 36 can be removably attached to drum 40 by any suitable means, for example, by means of a vacuum. Drum 40 and rolls 42 and 44 can be driven, for example, by stepper motors (not shown) which are actuated in timed relation to the movement of galvanometer 20 to advance the medium 30 in a cross-scan direction.

A thermal print medium which can be used to produce a transferred image in printer 10 can be, for example, a medium disclosed in U.S. Pat. No. 4,833,124, entitled "Process of Increasing the Density of Images Obtained by Thermal Dye Transfer," granted May 23, 1989. This patent is assigned to the assignee of the present invention. As disclosed in U.S. Pat. No. 4,833,124, the thermal print medium includes a donor element having a material which strongly absorbs at the wavelength of the laser. When the donor element is irradiated, this absorbing material converts light energy to thermal energy and transfers the heat to the dye in the immediate vicinity, thereby heating the dye to its vaporization temperature for transfer to the receiver element. The absorbing material may be present in a layer beneath the dye or it may be admixed with the dye. The laser beam is modulated by electronic signals, which are representative of the shape and color of the original image, so that each dye is heated to cause volatilization only in those areas in which its presence is required on the receiver element to reconstuct the color of the original object.

A thermal print medium of the type which produces a retained image can also be used in printer 10. In such a medium, no donor element is used, and a receiver element contains a dye layer. An image is formed by using the laser beam 16 to remove dye from selected areas on the receiver element.

Figure 2:
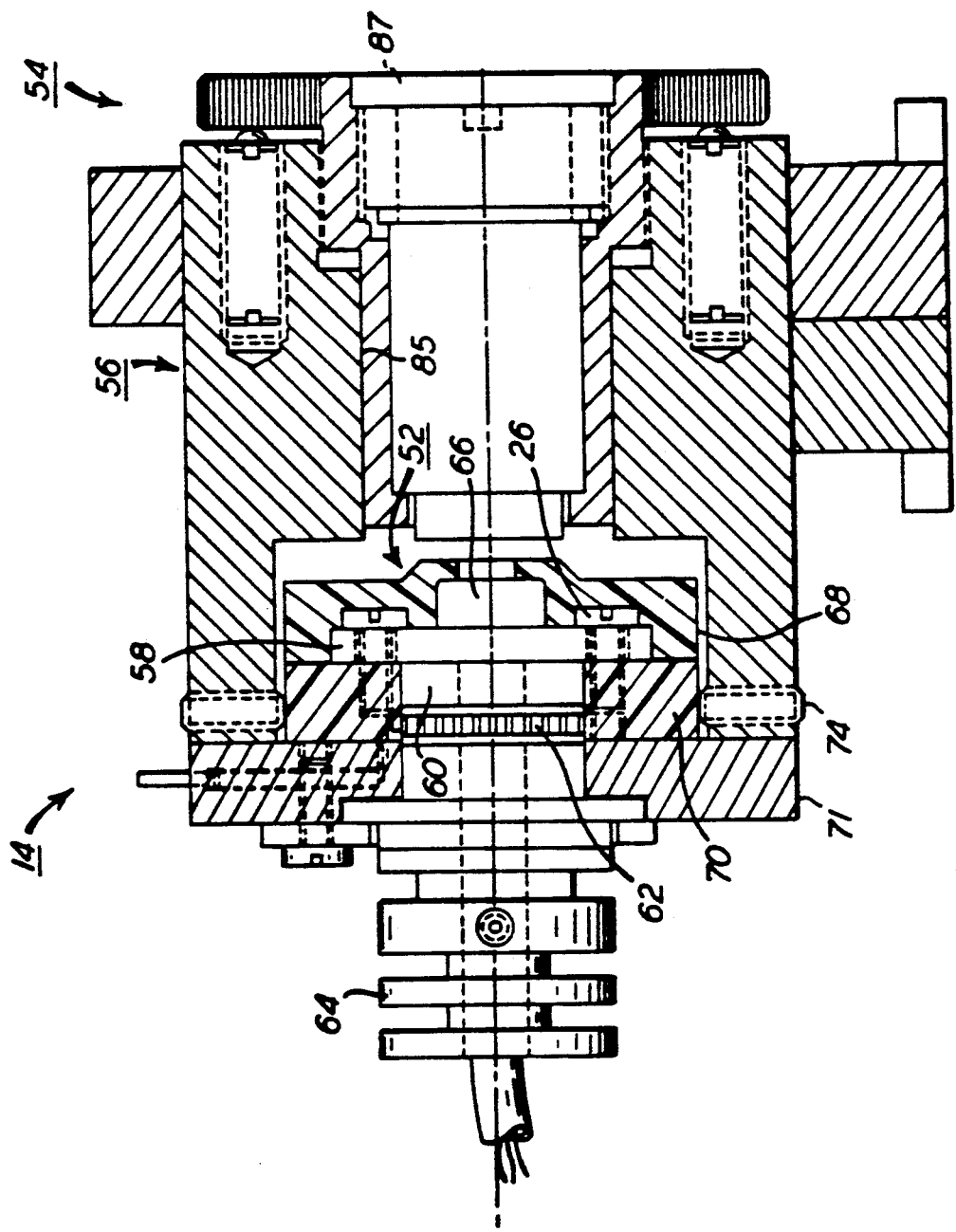
FIG. 2 is a side elevational view of an optical head which can be used in the present invention, with certain parts shown in section.

Optical head 14 can be constructed as shown in FIG. 2. Such a head is disclosed in detail in U.S. patent application Ser. No. 238,225, U.S. Pat. No. 4,948,221, entitled "Athermalized Optical Head," filed Aug. 30, 1988, in the name of Thomas E. Yates. The disclosure in application Ser. No. 239,225, U.S. Pat. No. 4,948,221, is expressly incorporated herein by reference. Optical head 14 comprises a light source 52 and an optical device 54, both of which are supported in a tubular support 56. Light source 52 includes a diode laser 58, a thermal transfer plate 60, a thermoelectric cooling element 62, and a heat sink 64. Diode laser 58 is surrounded at an output side 66 by a cover 68 which is formed of an insulator material, such as No. 106 silicone, obtainable from the RTV Corp. Diode laser 58 is mounted by means of fasteners 26 to an insulator ring 70 which is made of glass-filled polycarbonate, for example, such a material sold under the trademark Lexan 3414 by General Electric Co. Insulator ring 70 is mounted to an annular laser mount 71 by means of fasteners (not shown). Laser mount 71 can be, for example, copper. Set screws 74 in support 56 are screws 74 in support 56 are threaded into contact with insulator ring 70 to align light source 52 relative to optical device 54. Heat from diode laser 58 is transferred to heat sink 64 which expels the excess heat through a finned radiator (now shown) to the environment.

Optical device 54 includes a lens housing 85 which is adapted to receive collimating lens 22 and a threaded lens retainer 87. Diode laser 58 and lens 22 are mounted in optical head 14 such that the distance between the diode laser and the lens is maintained constant over a predetermined temperature range.

Figure 3:
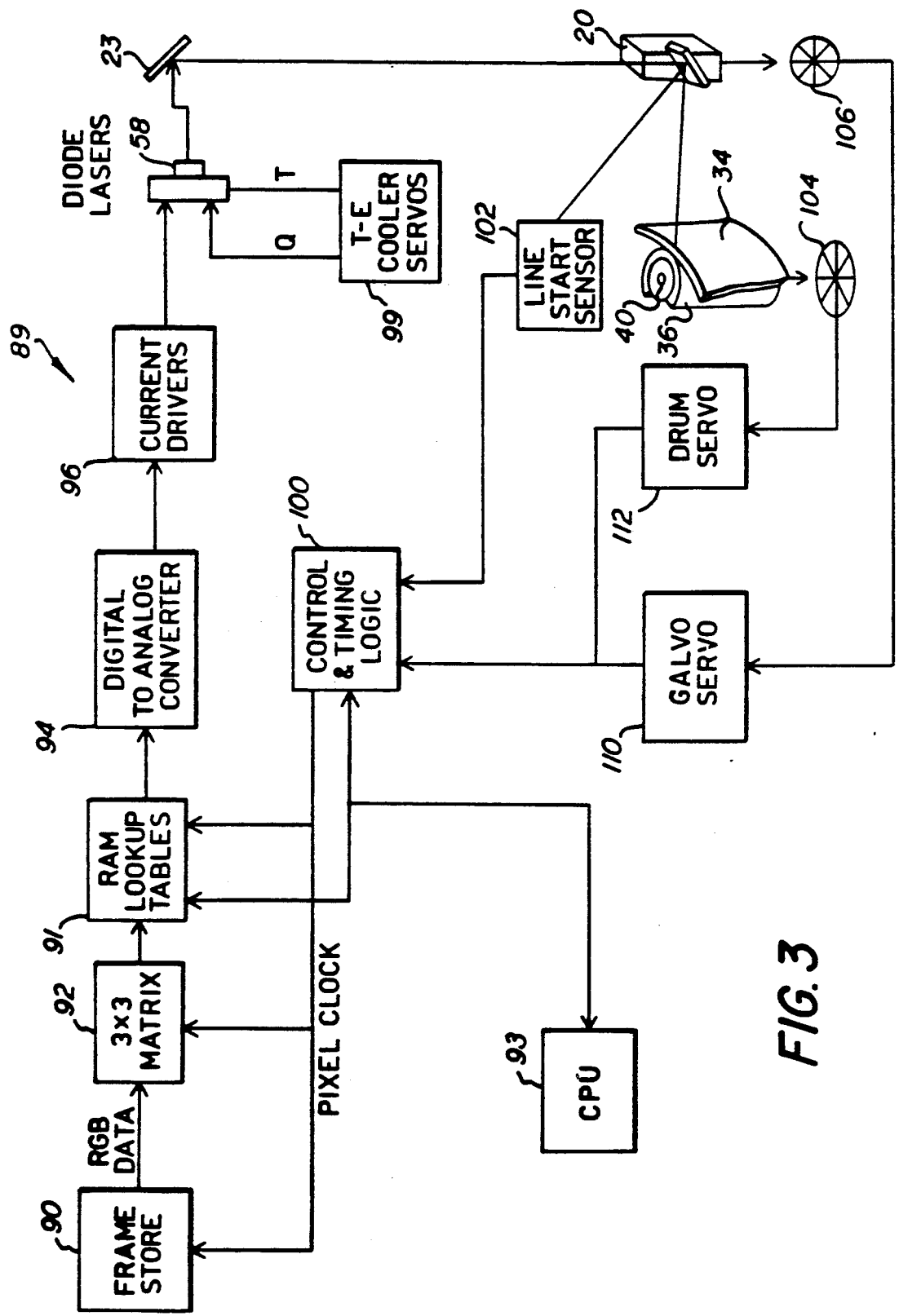
FIG. 3 is a block diagram of the electronic elements in the present invention.

A control system 89 for printer 10 are shown in FIG. 3. Control system 89 comprises a frame store 90 for storing image data received from an image scanner (not shown) or from an image storage medium (not shown). The data stored in frame store 90 includes, for example, three 8-bit values for each pixel, each value representing the red, green, or blue input for the pixel. A matrix multiplication circuit 92 multiplies the 8-bit red, green, and blue values by $3 \times 3$ matrix in order to effect desired color corrections.

The output from circuit 92 is applied to RAM lookup tables 91 which perform the necessary scaling for linearization and calibration. Updated values for the lookup tables 91 can be provided by a central processing unit 93. The digital outputs from lookup tables 91 are provided to a digital-to-analog (D/A) converter 94, and the outputs from the D/A converter drive the voltage-to-current driver 96 for the diode laser 58. A thermoelectric cooler for the diode laser 58 is controlled by a thermoelectric cooler servo 99.

A control and timing logic circuit 100 is provided to manage the data flow during the operation of printer 10 and to control the printer timing. Circuit 100 accepts timing signals from a drum servo 112, a galvanometer servo 110, and an optical fiber line start sensor 102, and uses these signals to synchronize the printing operations. These timing signals include a once-per-revolution pulse from drum servo 112 which receives inputs from an encoder 104, a once-per-cycle pulse from servo 110 which receives inputs from an encoder 106, and a line-start pulse that is generated when the laser beam crosses an optical fiber (not shown) in line start sensor 102. Upon receipt of these signals, a pixel clock is started and the data is clocked through the data circuits. Also included in circuit 100 are a pixels-per-line counter for line length control and a counter for controlling the addressing of the lookup tables 91.

In one illustrative embodiment of the present invention, diode laser 58 is a Model No. HL8351E, obtainable from the Hitachi Corp.; this laser is a 50 mw single transverse mode coherent laser which emits radiation at 830 nm. Collimating lens 22 is an NRC Model F-L20; lens 22 has a focal length of 8.6 mm and a numerical aperture of 0.5. Cylindrical lens 25 has a focal length of $-80.0$ mm and is a No. 01LCN135, obtainable from Melles Griot Co. Cylindrical lens 26 has a focal length of 250.0 mm, and is a No. 01LCP135, obtainable from Melles Griot Co. Galvanometer 20 is a Model No. 325DT, manufactured by General Scanning Co. F$\theta$ lens 32 has a focal length of 71 mm, and is a No. I-4921, made by D.O. Industries.

As noted above, diode laser 58 delivers 50 mw of coherent radiation in a single transverse mode. The Gaussian output of the laser 58 can be focused to a diffraction limited spot. This optical characteristic of the laser along with the disclosed optics makes it possible to obtain very high resolution in printer 10. A very high resolution is needed in transparencies in order to obtain a desired sharpness in a projected image. In one exemplary use of the present invention, where the laser beam 16 is focused to a 7 $\mu$m (FWHM) spot on the medium 30 and the spots are written at a pitch of 6 $\mu$m, a resolution of 4000 spots per inch can be obtained. Since the spot size can be varied, a higher or lower resolution can be obtained, if desired. It is also contemplated that lasers having a higher output could be used in the printer of the present invention, for example, lasers having an output of between 50 mw and 100 mw.

After an image has been formed on a receiver as described herein, it is desirable for certain mediums to apply heat to the receiver to fuse the image. One suitable way to fuse the image is to apply hot air at 120° C. to the image for approximately two minutes.

Printer 10 can be used to form slide transparencies in a number of different ways. In the use of a medium of a type which forms a transferred image, a monochrome image can be produced by passing donor 34 in contact with receiver 36 during a single pass, that is, during one revolution of drum 40. The receiver 36, which in this case is a transparent film, would than be removed from drum 40 and mounted in a suitable slide mount. If a color image is desired, the donor 34 would include separate spaced sections, for example, cyan, magenta, and yellow sections, and these sections would successively contact receiver 36 in separate passes of the drum 40. In the use of a medium of the type which forms a retained image, an monochrome image can be formed by one revolution of drum 40. It is also possible to make a color image using either type of medium by forming three separate images, one for cyan, one for yellow, and one for magenta, on three separate receivers 36; the three receivers would then be laminated to form a slide.

This invention has been described in detail with particular reference to the preferred embodiment thereof, but it will be understood that variations and modifications can be effected within the spirit and scope of the invention:

We claim:

1. A thermal printer for forming an image on a thermal medium for producing transparencies, said medium including a dye which is transferred by sublimation from a donor to a receiver as a result of heating the dye in the donor, said printer comprising:

means for supporting a thermal medium, said supporting means including means for supporting a receiver element and means for successively passing three separate donor elements in contact with said receiver element;

a light source which includes a diode laser, said diode laser being a single transverse mode coherent laser which produces power in the range between about 50 mw and about 100 mw;

means for modulating said diode laser in accordance with an information signal to produce a modulated beam;

optical means for shaping said modulated beam;

means for scanning said beam across said medium in a scan direction to heat selected areas of the donor elements;

means for effecting relative movement between said supporting means and said scanning means in a cross-scan direction; and means for controlling said scanning means, said modulating means, and said means for effecting relative movement in timed relation to each other, said controlling means including means for successively delivering three different color signals to said diode laser.

2. A thermal printer, as defined in claim 5, wherein said scanning means is a galvanometer.

3. A thermal printer, as defined in claim 1, wherein said optical means includes cylindrical lenses.

* * * * *

UNITED STATES PATENT AND TRADEMARK OFFICE
CERTIFICATE OF CORRECTION

PATENT NO. : 5,105,206

DATED : April 14, 1992

INVENTOR(S) : Sanwal P. Sarraf, Scott A. Brownstein and Michael J. Barry

It is certified that error appears in the above-identified patent and that said Letters Patent is hereby corrected as shown below:

Column 6, line 23, "claim 5" should read -- claim 1 --.

Signed and Sealed this

Twentieth Day of July, 1993

Attest:

MICHAEL K. KIRK

*Attesting Officer*  *Acting Commissioner of Patents and Trademarks*